United States Patent [19]

Goode

[11] 4,077,554

[45] Mar. 7, 1978

[54] WINDOW MOUNT SKI RACK

[76] Inventor: David P. Goode, 2015 Long Lake Shores, Orchard Lake, Mich. 48033

[21] Appl. No.: 695,314

[22] Filed: Jun. 11, 1976

[51] Int. Cl.² ............................................. B60R 9/12
[52] U.S. Cl. ......................... 224/42.46 R; 211/60 SK; 280/11.37 A; 224/45 S
[58] Field of Search ................ 224/42.46 R, 42.46 A, 224/42.43, 29 R, 42.45 R, 42.1 G, 42.03 B, 42.03 R, 42.1 F; 280/11.37 K, 11.37 A; 211/60 SK, 86, 113; 248/206 R, 208; 108/44, 46

[56] References Cited

U.S. PATENT DOCUMENTS

| Re. 27,170 | 9/1971 | Porter | 224/42.1 F X |
|---|---|---|---|
| 1,970,962 | 8/1934 | Hinckley | 224/42.45 R |
| 2,302,300 | 11/1942 | Davies | 224/42.45 R |
| 2,440,821 | 5/1948 | Godwin | 248/206 R UX |
| 2,474,513 | 6/1949 | Behrens | 224/42.45 R |
| 2,483,051 | 9/1949 | Holt | 211/86 X |
| 3,237,778 | 3/1966 | Hoodis | 248/206 R X |
| 3,927,810 | 12/1975 | Danon | 224/42.03 B |

*Primary Examiner*—Robert J. Spar
*Assistant Examiner*—Jerold M. Forsberg
*Attorney, Agent, or Firm*—Krass & Young

[57] ABSTRACT

A window-mount ski rack comprising a frame having spaced pairs of threaded rods mounted thereon, the inboard ends of the rods carrying suction cups which bear against the window, and the outboard portions of the rods carrying plastic sleeves upon which the skis rest. Flexible rubber ties bind the skis to the rods. Flat metal hangers extend from the frame to and over the top of the window to hold the rack in place. The rack fits any side or rear window and is quickly and easily mounted and demounted.

8 Claims, 3 Drawing Figures

WINDOW MOUNT SKI RACK

INTRODUCTION

This invention relates to racks for skis and the like and particularly to a rack which is easily mounted on the window of any conventional automotive vehicle.

BACKGROUND OF THE INVENTION

Various types of ski support racks for mounting on an automobile are commercially available. Typically such racks are adapted to be mounted on the roof, trunk and/or rear bumper and engine cover of the automobile. Roof racks typically comprise adjustable straps having hooks which are secured to the drip moldings above the side windows of the automobile. In recent years these drip moldings have become so fragile and flimsy as to be rather easily bent and broken by the forces imposed by such ski racks. Trunk racks are not universally usable; i.e., many automobiles have no trunks or otherwise lack the hardware which is necessary for installation of the rack. Still other ski racks require drilling through the automobile body thus complicating the installation and creating areas for rust and corrosion.

BRIEF DESCRIPTION OF THE INVENTION

The principal object of the present invention is to provide a ski rack which is quickly and easily mountable on substantially all conventional automotive vehicles without modification or danger of damage and which conveniently and securely carries one or more pairs of skis.

In general, this is accomplished by means of a rack which may be securely and quickly mounted on the side or rear window of the automobile. In accordance with the implementation of a specific embodiment hereinafter described in greater detail, the subject rack comprises a frame, at least a pair of parallel and longitudinally spaced elongated members such as rods carried by and extending from one side of the frame to form a rest for a pair of skis in a substantially level disposition, at least a pair of spaced suction cups carried by and extending from the other side of the frame for direct securement to the window, and one or more hanger members of flat stock, preferably metal, extending from the frame and having hooked free upper ends for disposition around the top edge of the window. By selecting a thin, flat metal stock for fabrication of the hanger, the hooked free end may be disposed over the top edge of the window without fear of damage due to the high unit loads and also permitting the window to be closed while the rack is in place.

As hereinafter set forth in greater detail, the subject rack requires no drilling of holes or other alteration of the vehicle body, is easily mounted on a wide variety of conventional vehicles inlcuding coupes, sedans, vans, trucks, station wagons, and other vehicles having side and/or rear windows. Moreover, installation of the rack presents no danger of bending or damage to vehicular body and trim elements. A clearer and more complete understanding of the invention will be apparent from the following description of a specific embodiment thereof.

DETAILED DESCRIPTION OF THE SPECIFIC EMBODIMENT

Figure 1:
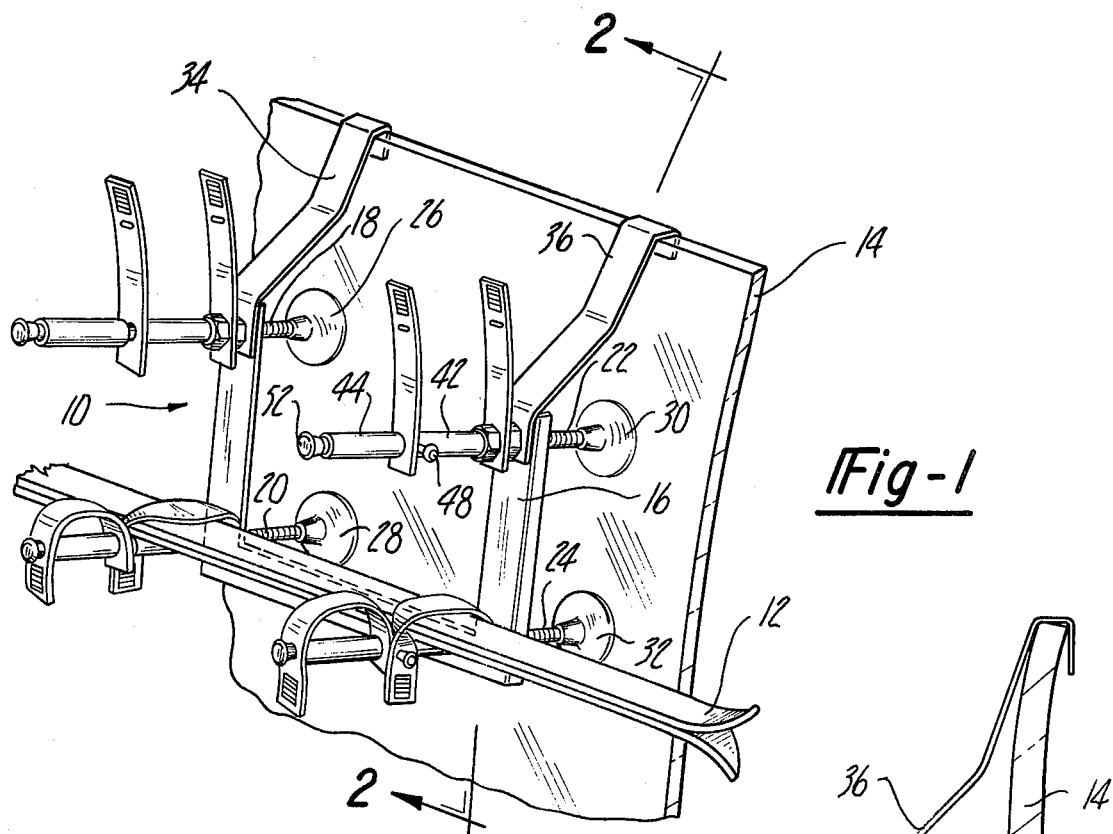
FIG. 1 is a perspective view of a specific embodiment of the invention designed to carry four pairs of snow skis in spaced parallel disposition.

Looking to FIG. 1, a rack 10 capable of supporting up to four pairs of snow skis 12 is mounted on the glass window 14 of a conventional automotive vehicle (not shown). Window 14 is preferably of the type which may be opened and closed by lowering and raising, respectively, within a frame and, although a rimless window is shown, it is to be understood that the rack 10 may also be mounted on windows having rims or border trim. Window 14 may be a side window or, in the case of a station wagon, a rear window.

Rack 10 comprises a U-shaped frame 16 of rigid metal, preferably aluminum, having a rectangular pattern of holes bored therethrough to receive a longitudinally and vertically spaced array of parallel threaded rods 18, 20, 22, and 24 which serve as rests for the skis 12 when the rack is mounted on the window 14. Although the automotive vehicle is not shown, it will be appreciated that rods 18 and 22 form one substantially horizontal ski rest while rods 20 and 24 form another substantially horizontal ski rest, the skis 12 being aligned substantially horizontally and parallel to the longitudinal axis of the vehicle. Rack 10 may, of course, be mounted on an openable rear window of a station wagon or recreational vehicle in which case the skis 12 are aligned transverse to the longitudinal axis of the vehicle, the important point is that the rack 10 is mounted on any substantially vertical window or panel of the vehicle having an available upper edge for purposes to be described.

Rods 18, 20, 22, and 24 project through the holes in the frame 16, the ends on the window side of the frame having suction cups 26, 28, 30, and 32 substantially permanently mounted thereon. The other ends of the rods project outwardly in the opposite directions to form the ski rests previously mentioned. Hangers 34 and 36 of thin, flat metal stock are disclosed on the upper rods 18 and 22 respectively and have upper ends which are hooked to fit over the top peripheral edge of the window 14 to support the rack 16 in the manner shown in FIG. 1. By suitable selection of the materials for hangers 34 and 36, a sufficiently thin construction may be accomplished so as to permit the window 14 to be closed into or against the adjacent seal strip with the rack 10 in place.

Figure 2:
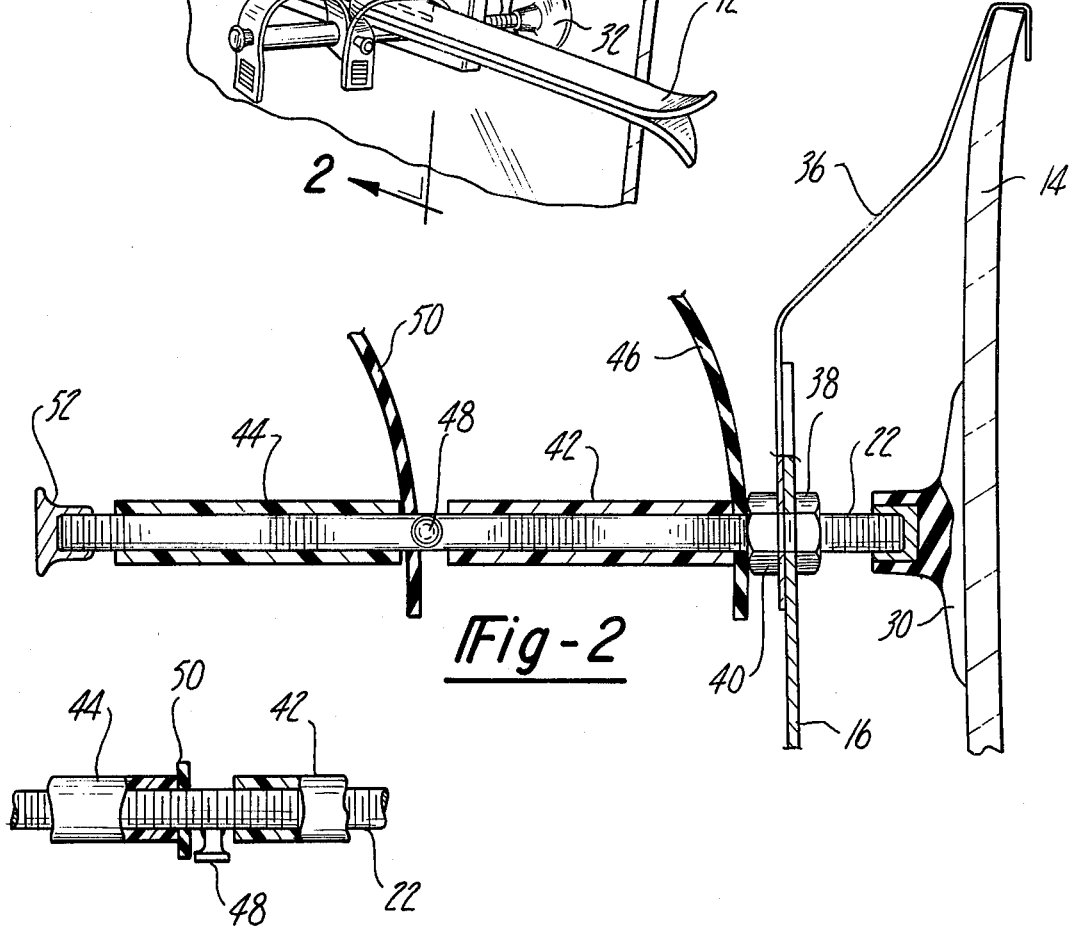
FIG. 2 is a side view, partly in section, of the upper half of the window mount ski rack of FIG. 1.
Figure 3:
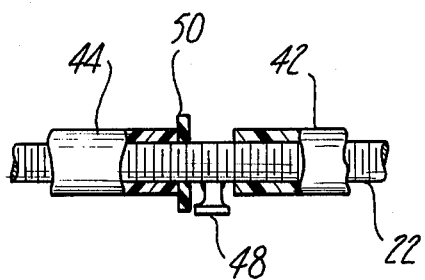
FIG. 3 is a top view, partly in section, of a detail of the ski rest rod indicating the position of a centrally mounted pin for securement of a flexible ski tie.

Looking now to the specific construction details of FIGS. 2 and 3, rod 22 will be taken as representative of the remaining three rods, simplicity and standardization of components in the rack 10 being one of the advantages of the present invention. Rod 22 is secured against rotation relative to the frame 16 by nuts 38 and 40 which are preferably rotated against one another to securely sandwich the frame 16 and hanger 36 therebetween. Rod 22 carries two soft polyethylene sleeves 42 and 44 at spaced locations thereon to serve as cushions for the skis 12 when disposed on the rack in the manner shown in FIG. 1. Between the inner end of sleeve 42 and the nut 40 a stretchable rubber tie 46 is disposed on the rod by passing the free end of the rod through a predefined hole near one end of the tie. A pin or button 48 is welded or otherwise secured to the rod 22 at approximately the center of that portion which projects to the left of the nuts 38, 42 in FIG. 2 to anchor the free end of the tie 46 by means of a predefined slit or aperture therein. Accordingly, tie 46 may be stretched over the pair of skis 12 and the free end secured to the button 48 to hold the skis in place exactly as shown on the lower rest position of the rack 10 in FIG. 1.

A second tie 50 is disposed outboard of the button 48 to secure the outboard ski pair. Tie 50 is provided with an aperture near the free end so as to permit the tie to be passed over a polyethylene end cap 52 which is placed on the outer end of the rod 22 as shown in FIG. 2.

Although rack 10 is shown in FIG. 1 to be designed to accommodate four pairs of skis, it will be understood that a rack for only two pairs of skis may readily be provided simply by shortening the rods. Various other modifications to the physical arrangement of rack 10 may, of course, be made. Ties 46 and 50 are preferably molded rubber and have gripping ridges formed near the free ends thereof to facilitate the fastening and unfastening operations.

From the foregoing description it can be seen that the rack 10 is substantially universally mountable on any substantially vertical side or rear window or like panel of a conventional automotive vehicle, requires no drilling or other modification of the vehicle body and securely carries one or more pairs of skis in a convenient and safe fashion. Rack 10 is substantially locked to the vehicle by securely closing the window 14 but may be quickly and easily demounted for storage when not in use. The extraordinarily small dimensions of the rack, relative to its ski carrying capacity, make both carrying and storage extremely convenient thus adding to the utility and satisfaction of the subject device.

The embodiments of the invention in which an exclusive property or privilege is claimed are defined as follows:

1. A ski rack adapted to be mounted on any substantially vertical window panel of an automotive vehicle comprising: a frame; at least one pair of spaced parallel elongate members carried by and extending through said frame, said elongate member ends extending from one side of the frame to form a rest for skis; said pair of elongate member ends extending from said other side of said frame each having mounted thereon a suction cup for securement to the window panel; and at least one hanger of flat stock extending from the frame transversely to said elongate members and having a hooked free end for disposition over the top edge of the window whereby said portion of said pair of elongate members are disposed in a substantially horizontal direction.

2. Apparatus as defined in claim 1 further including ties mounted on the portions of said elongate members forming said ski rest for strapping skis thereto.

3. Apparatus as defined in claim 2 further including a sleeve of soft polymeric material disposed on each of said pair of elongate members to form a cushion for the skis.

4. Apparatus as defined in claim 1 wherein the elongate members are threaded rods extending through the frames and having said suction cups securely mounted on one end thereof and further including a soft sleeve of polymeric material disposed on each of said pair of elongate members thereover on the other side of said rack.

5. Apparatus as defined in claim 1 wherein the frame is U-shaped, said one pair of elongate members being carried by the frame in spaced parallel relationship at the upper ends of the frame and further including a second parallel pair of elongate members being carried near the lower end of the frame to form a substantially rectangular support assembly, said second pair of elongate members also having suction cups mounted thereon for securement to the window.

6. Apparatus as defined in claim 5 wherein the elongate members are threaded rods having cushioning sleeves disposed thereover as well as end caps and tie means for binding skis thereto.

7. Apparatus as defined in claim 5 including a second hanger substantially parallel to said one hanger and having a hooked free end to be disposed over the upper edge of the window panel.

8. Apparatus as defined in claim 1 wherein each of said elongate members is sufficiently long to accommodate two pairs of skis in side-by-side relationship, said elongate members carrying stretchable ties secured at one end to the rod and being stretchable over the skis and secured to the rod at the other end, each rod having a pin disposed centrally thereon and between the skis when resting on the rod to accommodate the free end of one of said ties.

* * * * *